INVENTORS
DALE E. BENNETT
BERNARD L. FAMIGLIETTI
ROLLAND J. MEISCH
BY
ATTORNEY

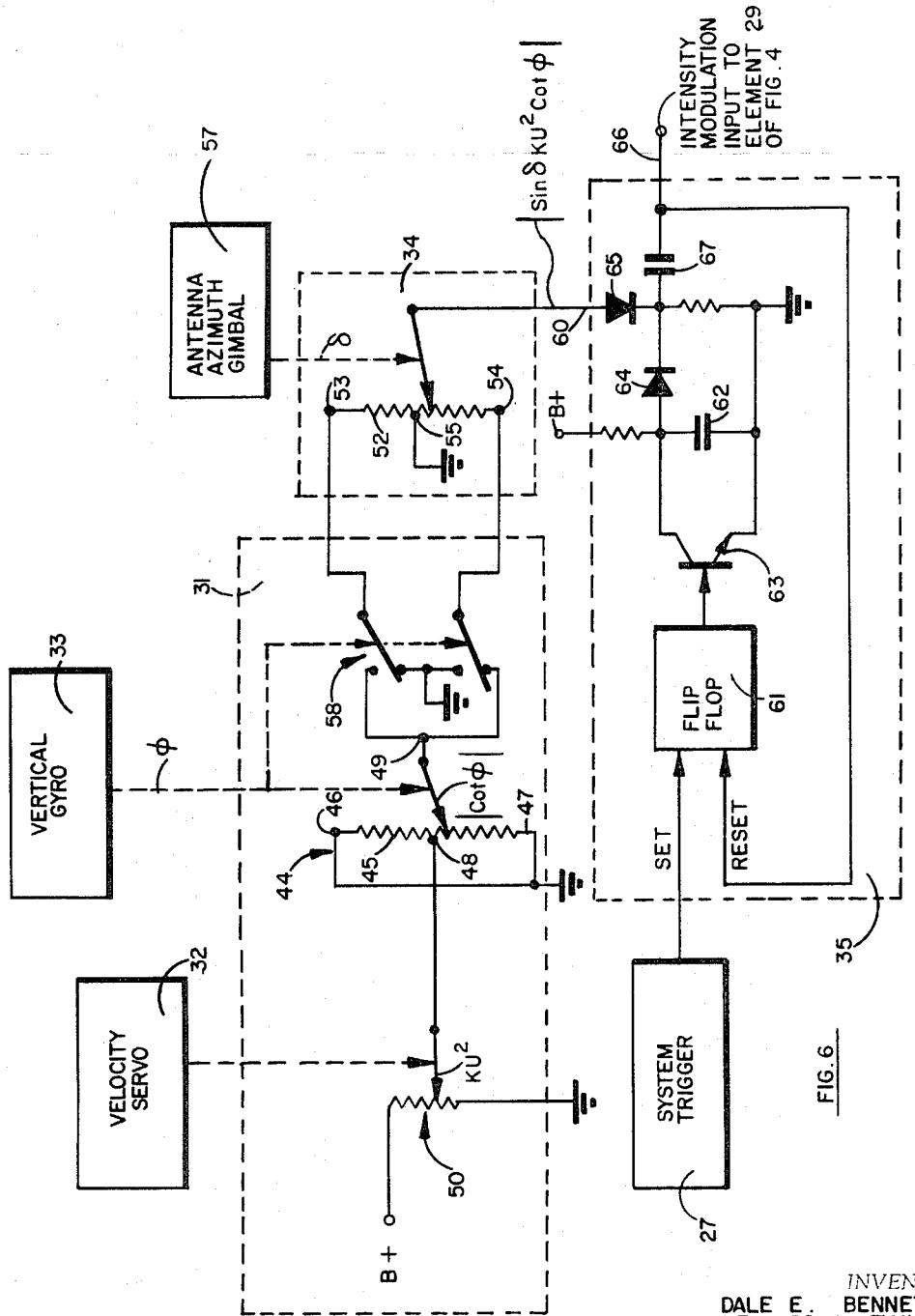

United States Patent Office 3,293,641
Patented Dec. 20, 1966

3,293,641
LATERAL MANEUVER INDICATOR
Dale E. Bennett, Fullerton, and Bernard L. Famiglietti and Rolland J. Meisch, Anaheim, Calif., assignors to North American Aviation, Inc.
Filed Feb. 15, 1965, Ser. No. 432,791
21 Claims. (Cl. 343—5)

The subject invention relates to a lateral maneuver indicator for laterally maneuvering vehicles, and more particularly to signalling apparatus for providing an indication of the predicted course of a roll-maneuvered vehicle.

With the advent of modern radar systems for use in both offensive and defensive armament systems, the tactics of airborne military vehicles have necessarily changed. In order for an airborne military vehicle to penetrate deep into a hostile or enemy territory and effectively conduct a military mission, it is required that the vehicle or aircraft fly as low as possible in order to avoid detection by ground-based radar installations, and yet fly as high above the terrain as will provide an adequate flight safety margin. The safe performance of such a flight mission has employed forward looking airborne radar means for detecting and displaying terrain obstacles at sufficient advance ranges as to allow the pilot to evasively maneuver and avoid such obstacles. A radar system suitable for detecting terrain obstacles lying above a clearance plane located at a selected distance below the aircraft, and providing a ground map or plan position indicator (PPI) display thereof, is described, for example, in U.S. Patent No. 3,165,740 for a Terrain Clearance Radar, issued on January 12, 1965, to W. E. Stoney, assignor to North American Aviation, Inc., assignee of the subject invention.

From such PPI display of the range and direction of terrain obstacles protruding above the clearance plane, the pilot may elect to increase the altitude of his aircraft until no such obstacles are displayed; although such climb maneuver increases the proability of detection of his vehicle. Alternatively, he may elect to change the heading or azimuth direction of his vehicle so as to laterally maneuver his aircraft around a terrain obstacle, without increasing his altitude. In this way, the terrain obstacle is avoided, without increasing the probability of the vehicle being detected. The performance of such lateral maneuvers is not undertaken without other associated hazards, however; which hazards are related to the difficulty of adequately predicting the future course or ground track of a laterally maneuvering aircraft, relative to the displayed terrain obstacles sought to be avoided.

The conventional PPI display apparatus includes a directional cursor or like means for indicating a straight line corresponding to the heading of the vehicle relative to the displayed terrain. When the aircraft is flying "straight and level" such cursor provides a convenient means of predicting the flight path of the vehicle relative to the displayed terrain obstacles. Where, under such straight and level conditions, the flight path direction of the vehicle does not correspond precisely with the heading of the vehicle, due to a drift angle condition, the cursor orientation is merely corrected by the amount of such drift angle. When the aircraft is not flying straight and level, but is in a lateral or turning manuever, the flight path of the vehicle is curved, rather than a straight line. Thus, a straight line cursor on the PPI display does not provide an accurate means of predicting the vehicle flight path relative to displayed terrain obstacles during a turning maneuver. Also, once a turning maneuver has been initiated (so as to avoid such terrain obstacles) it is not always immediately apparent to the pilot whether the manuever should be modified, so as to either increase or decrease the rate of turn, in order to assure clearance or avoidance of such obstacle.

By means of the concept of the subject invention, there is provided signalling means cooperating with a PPI display, for providing an improved indication of the predicted course of a laterally manuevering aircraft, whereby the disadvantages of a straight line cursor are avoided.

In a preferred embodiment of the invention there is provided a ground mapping radar having a plan position indicator, and signalling means responsive to the forward velocity U and bank angle $\phi$ of a utilizing aircraft for intensity modulating the indicator to provide at least one point of a locus of points having polar coordinates corresponding to the predicted course of the aircraft. The relationship between the range R and direction angle $\delta$ of the polar coordinates corresponds substantially with the following:

$$R = \frac{2U^2}{g} \sin \delta \cot \phi \qquad (1)$$

where U is the vehicle forward velocity, $\phi$ is the vehicle roll angle and $g$ is the gravitational constant in lineal units per unit of time squared.

By means of such arrangement, a variable or self-adaptive cursor is provided, the curvature of which is continuously varied or adjusted to provide an improved indication of the predicted course of an aircraft. In this way, the effect of a given lateral maneuver upon an attempt to avoid a displayed terrain obstacle is immediately apparent to the pilot. Accordingly, it is an object of the invention to provide an improved indication of the predicted course of a vehicle.

It is another object of the subject invention to provide signalling means for indicating the predicted course of a laterally maneuvering vehicle.

It is yet another object of the invention to provide means for displaying a predicted course of a roll-maneuvered vehicle.

It is still another object of the invention to provide means for predicting the course of a roll-maneuvered vehicle as a function of the roll-angle and forward velocity of such vehicle.

It is a further object of the invention to provide means for displaying the predicted course of a laterally maneuvering vehicle relative to displayed terrain obstacles as an aid to navigation.

It is still a further object of the invention to provide means for displaying a predicted course as a navigational aid in avoiding navigation obstacles.

These and other objects of the invention will become apparent from the following description taken together with the accompanying drawings in which:

FIG. 6 is a schematic diagram of a preferred embodiment of a portion of the system shown in FIG. 4.

In the drawings, like reference characters refer to like parts.

Figure 1:
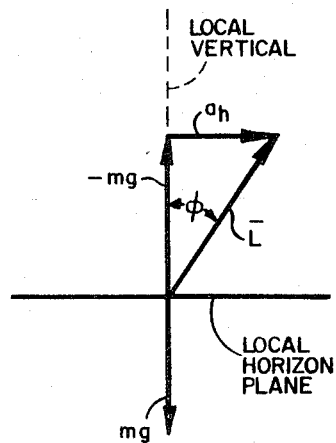
FIG. 1 is a vector diagram, illustrating the resolution of the lift vector of an aircraft in a roll maneuver.

As is well known, a straight and level flight condition is one in which the steady state pitching, rolling and yawing moments about an aircraft are trimmed or adjusted to zero. In such trimmed condition, the roll angle (or bank angle of the wings from the horizontal) is maintained nominally at zero. As a result, the lift vector produced by the aerodynamic lift surfaces, such as the wings, is in a substantially vertically upward direction and of like magnitude as the gravity vector, as to oppose the same. Where the aircraft performs a bank angle maneuver by rolling through a roll angle $\phi$, then the lift vector $\overline{L}$ is similarly angularly displaced from a vertical orientation, as shown in FIG. 1. The displaced lift vector $\overline{L}$ may be resolved into two mutually orthogonal components: a vertical component, $\overline{L} \cos \phi$ opposed to gravity; and a second, lateral component, $\overline{L} \sin \phi$.

In order to avoid losing altitude in a bank angle maneuver, the pilot operates the flight controls to increase the lift vector $\overline{L}$ so as to maintain a constant altitude. In this condition, the magnitude of the vertical component of the resolved lift vector is equal to gravitational force:

$$\overline{L} \cos \phi = mg \qquad (2)$$

or $$L = mg/\cos \phi \qquad (3)$$

The amount of the associated horizontal lateral component, $a_h$, of the lift vector is equally readily determined:

$$a_h = \overline{L} \sin \phi \qquad (4)$$

Substituting Equation 3 into Equation 4

$$a_h = mg \tan \phi \qquad (5)$$

Figure 2:
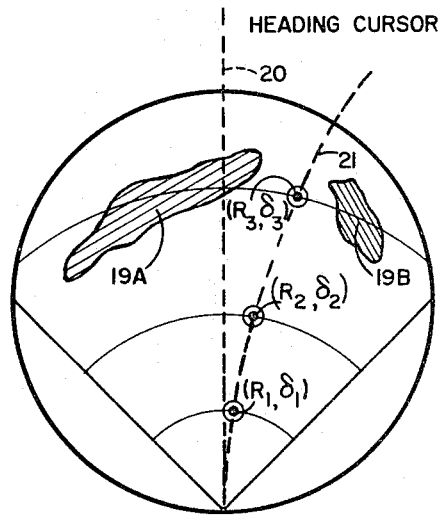
FIG. 2 is a diagram of the predicted curved flight path of a vehicle having a forward velocity and lateral acceleration component overlaid on a PPI display of terrain obstacles.

The combined effects of the forward velocity and the lateral accelerations of the aircraft in the bank angle maneuver, result in an azimuthally turning flight path, as shown in FIG. 2.

Referring to FIG. 2, there is illustrated a PPI display provided by an airborne mapping radar, of the type described in the above mentioned U.S. Patent No. 3,165,740, and displaying terrain obstacles 19 to be avoided relative to a prior art heading cursor 20 corresponding to the heading of a utilizing vehicle. Also shown is a curve 21 corresponding to the predicted flight of a vehicle performing a desired constant bank angle maneuver so as to steer between two displayed terrain obstacles. The intersection of such path with each of the range circles, $R_1$, $R_2$ and $R_3$ describes a point having a set of polar coordinates representing a range $R_n$ and direction angle, $\delta_n$.

Such a turning maneuver is normally performed, by either a trained pilot or an automatic flight control system, as a so called coordinated maneuver, which means that the lateral forces parallel to the bank angle plane of the vehicle are zero. In such a condition, referred to as a zero sideslip condition, the net horizontal lateral acceleration acting upon the vehicle is only that of the resolved lift vector, $g \tan \phi$. Hence, the predicted flight path of the vehicle may be determined from the vehicle forward velocity, $U$, and the bank angle $\phi$, as shown in FIG. 3.

Figure 3:
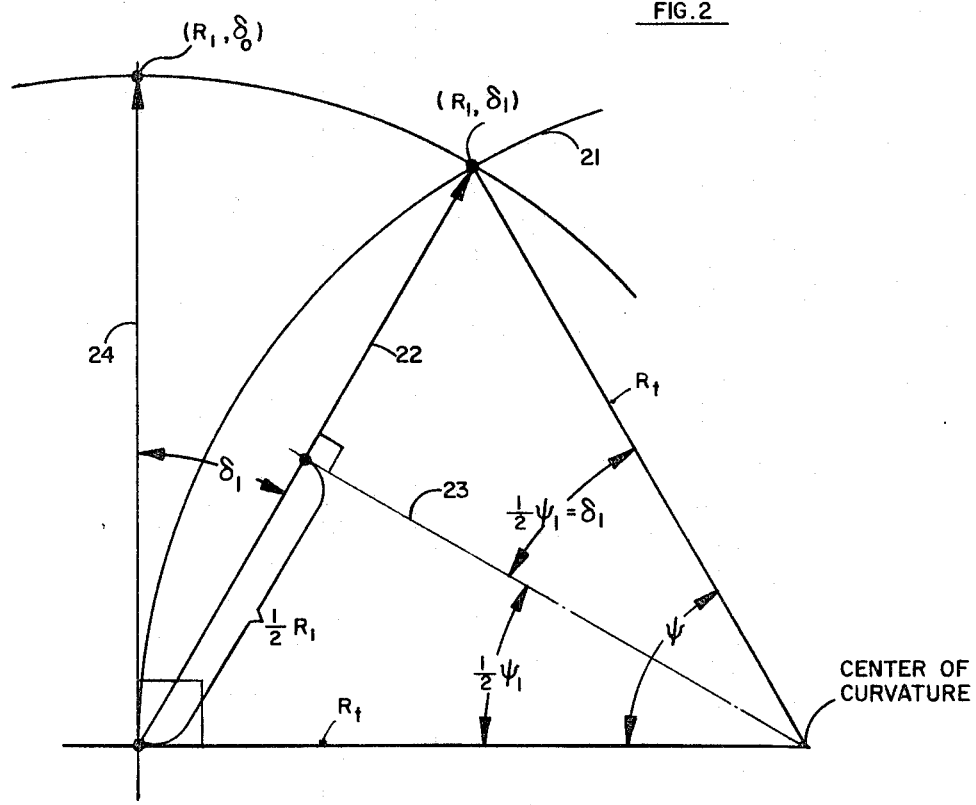
FIG. 3 is a diagram of the geometry of the curved flight path of FIG. 2, illustrating the polar coordinates of one point on such path.

Referring to FIG. 3, there is illustrated the geometry of the predicted flight path 20 of a vehicle performing a coordinated roll maneuver. As is well understood in the art, such flight path is a circular path or curved path of fixed radius of curvature (also called the turning radius, $R_t$), the magnitude of which radius $R_t$ is determined from the lateral horizontal acceleration, $g \tan \phi$, and the forward velocity $U$ of the vehicle, as follows:

$$R_t = \frac{U^2}{g \tan \phi} \qquad (6)$$

The polar coordinates ($R_1$, $\delta_1$) of a point upon such curve may be determined as follows.

For a small angle approximation for $\delta_1$, $\delta_1$ is presumed equal to one half the included angle $\psi_1$ subtended by the turning radii $R_t$ between the point of origin ($R_0$, $\delta_0$) and the point of interest ($R_1$, $\delta_1$). In other words, the chord 22 connecting the two equal radii $R_t$ completes an isosceles triangle, a bisector 23 of apex angle $\psi_1$ forming a perpendicular bisector of chord 22, and the angle $\delta_1$ subtended by the tangent 24 and the chord 22 being approximately equal to one half the bisected angle, $\psi_1$.

Also, as may be seen from FIG. 3, one-half the length of the cord 22 is related to the turning radius $R_t$ as follows:

$$R_1/2 = R_t \sin \delta_1 \qquad (7)$$

Substituting Equation 6 in Equation 7

$$\frac{R_1}{2} = \frac{U^2}{g \tan \phi} \sin \delta_1 \qquad (8)$$

Rearranging Equation 8:

$$R_1 = \sin \delta_1 K U^2 \cot \phi \qquad (9)$$

where:

$$K = 2/g$$

and:

$g$ = the gravitational constant

Where, however, the range of maneuvering velocities of the vehicle is sufficiently small, the forward speed $U$ may be assumed to be constant, and Equation 9 may be simplified as follows:

$$R_1 = K' \sin \delta \cot \phi \qquad (10)$$

where:

$$K' = 2U^2/g$$

Hence, it is to be appreciated that for a selected predicted direction $\delta_1$, the corresponding predicted range of a point on a predicted flight path can be determined from the airspeed $U$ and bank angle $\phi$ which produce such flight path. In other words, the polar coordinates of a locus of points describing a predicted flight path resulting from a roll maneuver may be thus determined and displayed as functions of such bank angle and vehicle forward velocity, as shown in FIG. 4.

Figure 4:
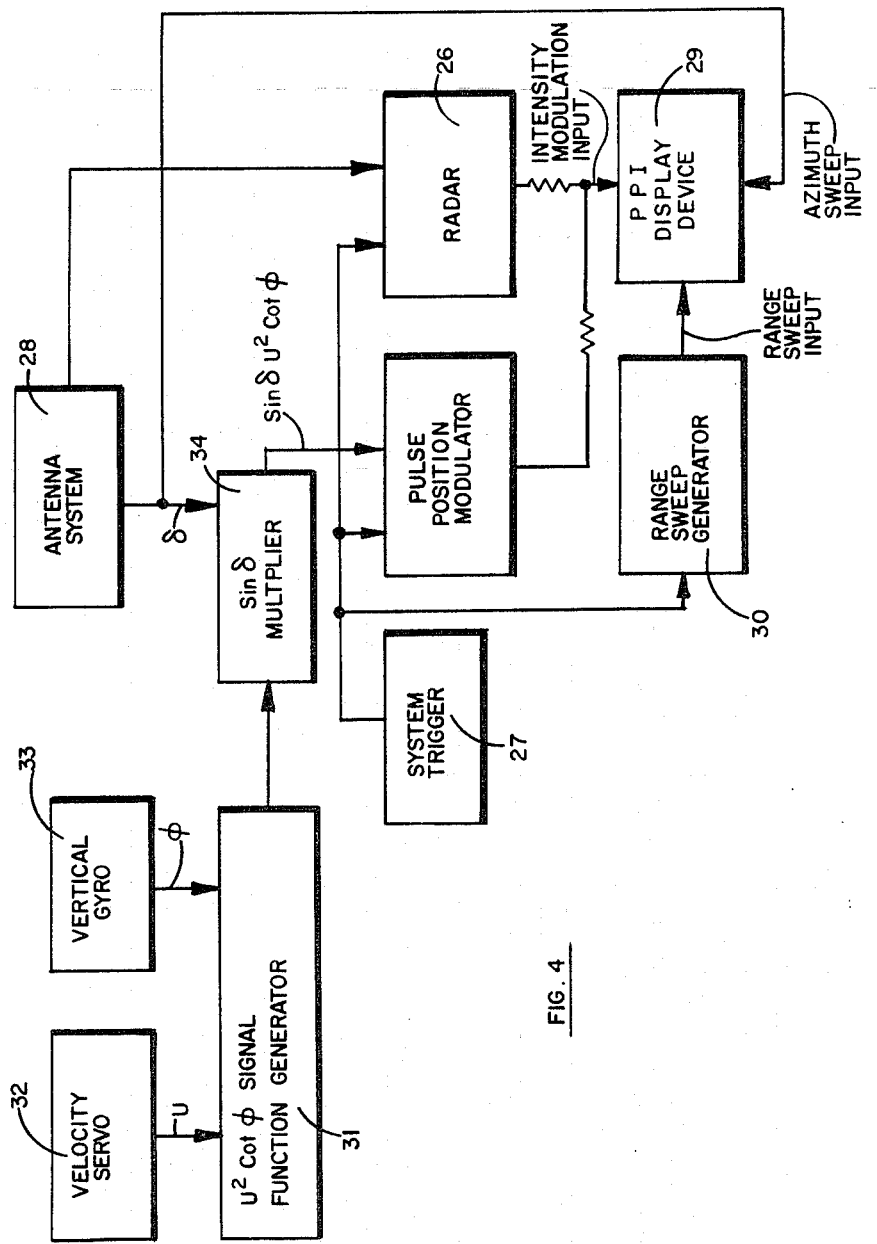
FIG. 4 is a block diagram of a system embodying the concept of the invention.

Referring to FIG. 4, there is illustrated a block diagram of a system embodying the concept of the invention. There is provided mapping radar means adapted for airborne use and comprising a radar system 26, system trigger 27, azimuthally scanning antenna 28, plan position indicator (PPI) display device 29, and range sweep generator 30, all arranged to cooperate by means well-understood in the art. Therefore, such elements are illustrated in block form for convenience only. There is further provided function generator means 31 responsive to the forward velocity $U$ and bank angle $\phi$ of a utilizing aircraft for generating a signal substantially indicative of the function $U^2 \cot \phi$, included in Equation 9. Input signals indicative of the quantities $U$ and $\phi$ may be obtained from an air speed servo 32 and a vertical gyro 33, respectively, or like means known in the art for providing such signals. Accordingly, elements 32 and 33 are shown in block form only. Actually, a measure of ground speed is to be preferred to that of air speed. However, the percentage difference between the ground speed and air speed of a modern high-performance high aircraft is very small. Further, such vehicles conventionally employ air speed servo devices as standard equipment whereby such inputs may be conveniently provided for the subject invention.

The output of function generator 31 is fed to a signal multiplier 34, which is further responsive to the azimuth direction or orientation $\delta$ of directional antenna 28 relative to the heading or fuselage reference line of a utilizing aircraft. Multiplier 34 provides an output signal indicative of the product of $\sin \delta$ and $U^2 \cot \phi$ and suitably scaled to correspond to the function, $$\sin \delta \frac{2U^2}{g} \cot \phi$$

of Equation 9.

The output of multiplier 34 is applied as a phase control signal to a control input of a pulse position modulator 35, which is further responsively coupled to system trigger 27 for generating a periodic pulse output. The time-phase occurrence of such pulse output, relative to the occurrence of the system trigger, is modulated as a function of the amplitude of the applied control signal from multiplier 34. Such time-phase modulated pulse output from modulator 35 is then applied as an intensity modulation input to the plan position indicator 29 for periodically providing an intensity modulated spot for each displayed azimuth direction $\delta_i$, by an amount corresponding to a range $r_i$, associated with such direction angle and as a function thereof, in accordance with the relationship of Equation 9.

In normal operation of the device of FIG. 4, there is generated and displayed a locus of display points, each point having a set of polar coordinates corresponding to a successive range $R_i$ and direction angle $\delta_i$ indicative of the predicted flight path of a roll-maneuvered vehicle. Such operation of the arrangement of FIG. 4 may be more easily understood from FIG. 5.

Figure 5:
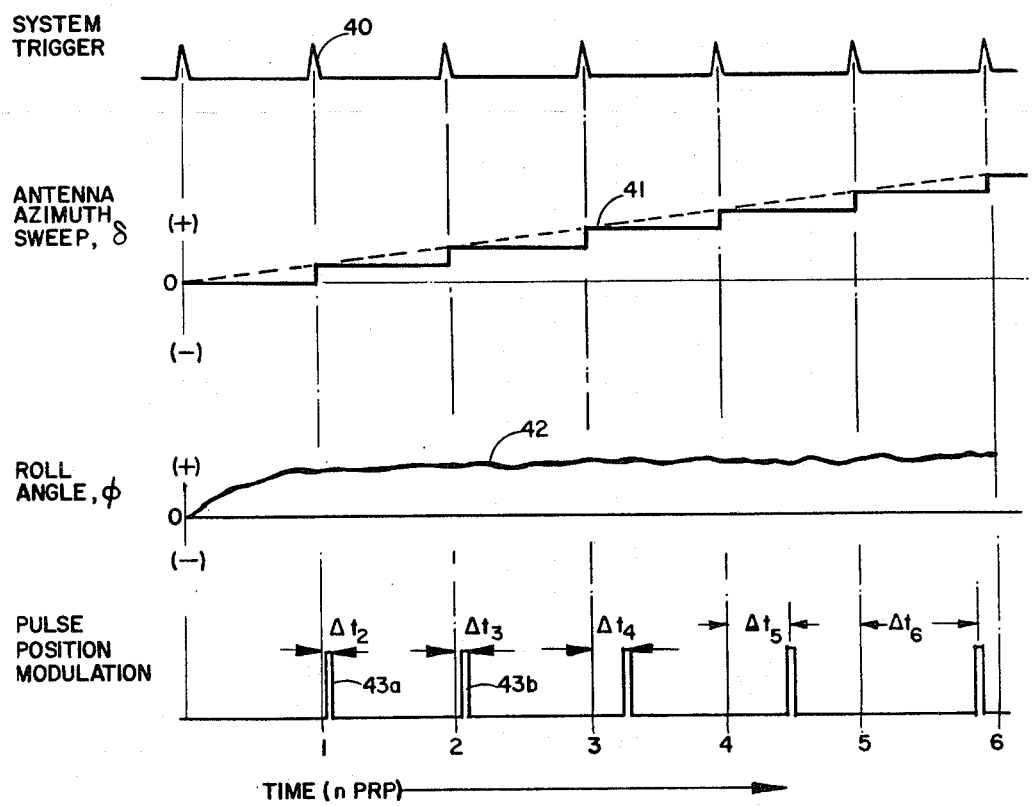
FIG. 5 is a family of time histories illustrating the response of several of the elements of FIG. 4.

Referring to FIG. 5, there is illustrated a family of time histories of certain elements of the system of FIG. 4. There is illustrated by curves 40, 41, 42 and 43 a representative periodic response of system trigger 27, orientation $\delta$ of scanning antenna 28, roll angle response $\phi$ of vertical gyro 33 (to an initiated roll manuever), and the output of pulse position modulator 35, respectively. As a representative positive roll manuever (corresponding to a right turn) is commenced, for example, the roll angle $\phi$, indicated by curve 42, increases from zero to a selected magnitude, indicated by the nominal steady state amplitude of curve 42. The azimuth angle $\delta$ of scanning antenna 28, shown by curve 41, is progressively varied to the right (+ values) by an antenna programmer (not shown) within the antenna control system, and is shown crossing zero (the aircraft heading) at the initiation of the roll manuever, for convenience in exposition only. Although the antenna direction angle is progressively changing at the selected scan rate, it may be considered as having a discrete value for each discrete pulse repetition period. The combined affect of the progressively increasing antenna angle $\delta$ (curve 41) and the nominal roll angle (curve 42) is to cause the pulsed output of modulator 28 (occurring each pulse repetition interval of the system trigger) to be progressively delayed relative to the system trigger. Such time-phase delay corresponds to a progressively increased predicted range position R associated with progressively increased values of $\delta$, having a like sense as the roll angle manuever. For a given roll angle and constant velocity U, such predicted range for an associated direction angle, as predicted by Equation 9 is seen to vary as a sine function of the angle $\delta$.

For example, during the second pulse repetition period (the interval occurring between 1PRP and 2PRP in FIG. 5), the $\Delta t_2$ delay of pulse 43a represents a predicted range $R_2$ associated with the discrete value $\delta_2$ of the antenna azimuth angle (curve 41) occurring during such interval, and which consequently produces a display point corresponding to that having the polar coordinates $(R_2, \delta_2)$ in FIG. 2. During a subsequent pulse repetition period corresponding to a successively greater azimuth angle, $\delta_3$, (curve 41 occurring, say, during the interval between 2PRP and 3PRP), the associated delay $\Delta t_3$ of pulse 43b is seen to be greater than the delay $\Delta t_2$, and represents a correspondingly increased prediction range $R_3$ associated with predicted direction angle $\delta_3$ in FIG. 2. Similarly, subsequently generated pulses during subsequent pulse repetition periods associated with successive antenna displayed azimuth angles (having a sense relative to the vehicle which corresponds with the sense of the vehicle manuever direction) will be progressively delayed relative to the system trigger. Such progressive delays will be indicative of the progressive predicted ranges associated with such increased prediction angles, and correspond to the locus 21 of the display cursor shown in FIG. 2.

A more detailed illustration of the arrangement of the function generator, multiplier and pulse position modulator of FIG. 4 is shown in FIG. 6.

Referring to FIG. 6, there is illustrated an exemplary embodiment of a portion of the system of FIG. 4.

There is provided a first nonlinear position pickoff 44 responsive to a bank angle $\phi$ signalling source and having a center tapped excitation element 45 with two commonly connected end terminals 46 and 47. A center tap terminal 48 and one of the commonly connected terminals 46 and 47 are connected across a voltage excitation source having an amplitude varying substantially in accordance with the square of the velocity of a utilizing vehicle, the output terminal 49 of pickoff 44 providing an attenuated signal which is attenuated substantially in accordance with the function, cot $\phi$. Pickoff element 44 may be comprised of a nonlinearly wound potentiometer, wound to generate the function cot $\phi$ and mounted upon the roll axis output of a vertical gyro, as is well understood in the art. The maximum output of such a potentiometer will not be an infinitely large voltage for a zero angle or central position of the potentiometer wiper, however; instead, it will be a finite voltage equal to the excitation potential applied to center tap terminal 48. Such practical limitation is not deemed a disadvantage, but is to be preferred in the design and construction of a practical device.

The excitation source applied to terminal 48 may be a fixed amplitude voltage source, where the velocity of a utilizing vehicle is deemed sufficiently constant for all maneuvers of interest. Where, however, the maneuvering speed of the vehicle tends to vary substantially, such excitation source may be comprised of a voltage source having an amplitude which varies substantially in accordance with the square of the speed of the utilizing vehicle. Such arrangement may be comprised, for example, of a nonlinear potentiometer 50, wound to provide a gain which varies as the square of the position of the potentiometer pickoff, the potentiometer being excited by a constant voltage. Where the potentiometer settings are calibrated in terms of airspeed, the pilot may adjust the potentiometer to the airspeed of the vehicle and the potentiometer will provide an output which varies with the square of the adjusted setting. Alternatively, the potentiometer may be ganged to the mechanical output of an airspeed servo 32, or like means, for automatically providing a signal which varies as the square of vehicle speed.

There is further provided a nonlinear position pickoff 34 responsive to the direction angle $\delta$ of the antenna azimuth gimbal of the antenna 28 of FIG. 4, and having a center tapped excitation element 52 with two end terminals 53 and 54. End terminals 53 and 54 are connected to output terminal 49 of first pickoff 44, and a center tap terminal of pickoff 34 is connected to commonly connected terminals 46 and 47 of first pickoff 44. Nonlinear pickoff 34 may be a nonlinearly wound potentiometer or like means well known in the art for generating the function $|\sin \delta|$. By means of this arrangement, an output terminal 56 of element 34 provides an attenuated signal indicative of the function, $|\sin \delta K U^2 \cot \phi|$.

Such function for display control purposes, should preferably be generated only for antenna azimuth angles $\delta$ having the same sense as the aircraft roll manuever $\phi$. For example, the predicted flight path curving to the right of the vehicle heading, in FIG. 2, corresponds to a bank angle to the right which produces a lateral maneuver to the right. Accordingly, means is included in the embodiment of FIG. 6 for exciting only that portion of function potentiometer 34 having a sense corresponding to that of the bank angle $\phi$ detected by vertical gyro 33.

There is further provided in FIG. 6 a double-pole double-throw switch 58, mechanically driven by vertical gyro 33 and interposed in circuit between terminal 49 and terminals 53 and 54 for connecting an alternative one and disconnecting the other one of terminals 53 and 54 upon a change of sense of the bank angle $\phi$. As illustrated, switch 58 connects terminal 54 of multiplier 34 to output terminal 49 of potentiometer 44 for roll angles $\phi$ having a sense corresponding to the direction of terminal 47 relative to terminal 48. Hence, the output terminal 56 of multiplier 34 provides an output corresponding to $|\sin \delta KU^2 \cot \phi|$ for antenna angles $\delta$ having a sense indicative of that indicated by the direction of terminal 54 relative to terminal 55, corresponding to the illustrated sense of the roll angle $\phi$. Similarly, when the sense of the roll angle is reversed (when the wiper of potentiometer 44 is between terminals 46 and 48), then switch 58 will interconnect terminals 53 and 49, and disconnect terminal 54, whereby the output terminal 56 of multiplier 34 provides an output for antenna angles having a sense indicative of that indicated by the direction of terminal 53 relative to terminal 55 and corresponding to a roll angle sense opposite to that illustrated by the illustrated position of the wiper of potentiometer 44. In other words, elements 31' and 34 cooperate to generate the even valued function $|\sin \delta KU^2 \cot \phi|$ for only antenna angles $\delta$ having a sense corresponding to that of the measured bank angle $\phi$.

The output signal from multiplier 34 is fed to a control input 60 of pulse position modulator 34 for modulating the time-phase of a periodic output pulse, generated in response to system trigger 27. The construction and arrangement of such pulse position modulators is known in the art, and the detail arrangement of FIG. 6 is intended to be exemplary only. Such arrangement may include a flip-flop circuit 61 having a SET input responsive to system trigger 27 for applying a step input waveform to a sawtooth waveform generator comprising an integrating capacitor 62. Flip flop 61 cuts off a conductive transistor 63 shunted across capacitor 62, whereupon capacitor 62 starts to charge. Capacitor 62 is coupled to an output circuit by a coupling diode 64, which is back biased by the control input from multiplier 34, applied through a back-biasing diode 65. Hence, no output occurs at the output terminal 66 of modulator 35 during that interval within which the stored voltage on capacitor 62 is increasing to the value of the control bias. Upon the amplitude of the stored voltage of capacitor 62 exceeding the applied control bias from multiplier 34, a pulse output is coupled from blocking capacitor 67 to output terminal 66, and also to the RESET input of flip-flop 61. Thus, an intensity modulating pulse input is provided on terminal 66, having a time phase delay representing a radar time, $R = |\sin \delta KU^2 \cot \phi|$. The concomitant resetting of flip flop 61 allows the device to be controlled by a subsequent control input from multiplier 34 during a subsequent pulse repetition interval of system trigger 27.

Hence, means has been described for displaying a locus of points representing the predicted course line of a roll maneuvered vehicle, each point representing a set of polar coordinates ($R_i$, $\delta_i$) in which the displayed range R tends to increase as the displayed direction angle $\delta$ increases, and to decrease with increases in the bank angle $\phi$ of the roll maneuvered vehicle.

Although the device has been described in terms of an exemplary embodiment for generating a range signal as a function of direction angle $\delta$ and roll angle, $\phi$, the device of the invention is not so limited. In an alternate arrangement, a fixed range circle of a plan position indicator display may be intensity-modulated at a time corresponding to a selected direction angle, $\delta$. In other words, for a selected range $R_1$, the predicted direction angle $\delta_1$, may be determined as a function of roll angle $\phi$, substantial in accordance with the relationship of Equation 9, rearranged as follows:

$$\delta_1 = \sin^{-1}\left[\frac{R_1}{KU^2} \tan \phi\right] \quad (11)$$

Accordingly, a radar navigation aid means has been described for displaying the predicted course line of a roll-maneuvered vehicle, whereby displayed terrain obstacles may be avoided with greater certainty.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In cooperation with an utilizing aircraft and a ground-mapping radar having a system trigger, a scanning antenna and a plan position indicator, prediction signalling means for providing an indication of the predicted course of said aircraft, comprising First means responsive to the roll angle of said utilizing aircraft and the scanning direction of said scanning antenna for providing a control signal; and Pulse delay means operatively coupled to said system trigger for providing an intensity modulation pulsed input to said plan position indicator, a control input of said pulse delay means being responsive to said control signal for providing a selective phase delay of said pulsed input relative to said system trigger as a function of said roll angle and scanning direction.

2. In cooperation with an utilizing aircraft and a ground-mapping radar having a system trigger, a scanning antenna and a plan position indicator, prediction signalling means for providing an indication of the predicted course of said aircraft, comprising Means responsive to the roll angle and velocity of said utilizing aircraft and to said scanning direction of said scanning antenna for providing a control signal; and Pulse delay means operatively coupled to said system trigger for providing an intensity modulation pulsed input to said plan position indicator, a control input of said pulse delay means being responsive to said control signal for providing a selective phase delay of said pulsed input relative to said system trigger.

3. In cooperation with an utilizing aircraft and a ground-mapping radar having a system trigger, a scanning antenna and a plan position indicator, prediction signalling means for providing an indication of the predicted source of said aircraft, comprising Means responsive to the roll angle of said utilizing aircraft and the direction angle of said scanning antenna for providing a control signal which tends to increase with said direction angle and tends to decrease with said roll angle; and Pulse delay means operatively coupled to said system trigger for providing an intensity modulation pulsed input to said plan position indicator, a control input of said pulse delay means being responsive to said control signal for providing a selective phase delay of said pulsed input relative to said system trigger as a function of said roll angle and scanning direction.

4. The device of claim 3 in which said means responsive to roll angle is further responsive to the speed of an utilizing vehicle for tending to increase said control signal with an increase in said speed.

5. In cooperation with an aircraft, prediction signalling means for providing an indication of the predicted course of said aircraft, comprising A ground-mapping radar having a plan position indicator, and Signalling means responsive to the bank angle of the aircraft for intensity modulating said indicator to provide at least one point of a locus of points having polar coordinates corresponding to said predicted aircraft course.

6. The device of claim 5 in which said signalling means responds to said bank angle $\phi$ to provide at least one display point on said indicator having a set of polar coordinates of range R and angles $\delta$ substantially in accordance with the following relationship:

$$R_1 = K \sin \delta_1 \cot \phi$$

Where:

$$K = 2U^2/g$$

$g=$ the gravitational constant in lineal units per unit of time squared
$U=$ forward velocity of said aircraft 7. In cooperation with an aircraft, prediction signalling means for providing an indication of the predicted course of said aircraft, comprising
A ground-mapping radar having a plan position indicator, and
Signalling means responsive to the forward velocity and bank angle of the aircraft for intensity modulating said indicator to provide at least one point of a locus of points having polar coordinates corresponding to said predicted aircraft course.

8. The device of claim 7 in which said signalling means responds to said velocity U and bank angle $\phi$ to provide at least one display point on said indicator having a set of polar coordinates of range $R_i$ and angle $\delta_i$ substantially in accordance with the following relationship:

$$R_i = \sin \delta_i \frac{2U^2}{g} \cot \phi$$

where $g$ represents the gravitational constant in lineal units per unit of time squared.

9. In cooperation with an aircraft, prediction signalling means for providing an indication of the predicted course of said aircraft relative to viewed terrain, comprising
A ground mapping radar having a plan position indicator;
Function generator means responsive to the forward velocity and bank angle $\phi$ of said aircraft for substantially generating the function $U^2 \cot \phi$; and
Means responsive to said function generator and for intensity modulation of said indicator with at least one display point of a locus points each having polar coordinates corresponding to a range $R_i$ and direction angle $\delta_i$ in accordance with the following relation:

$$R_i = \left| \sin \delta_i \frac{2U^2}{g} \cot \phi \right|$$

where $g$ is the gravitational constant.

10. In cooperation with a ground-mapping radar having a plan position indicator,
A function generator responsive to the forward velocity U and bank angle $\phi$ of an utilizing aircraft for generating substantially the function $U^2 \cot \phi$;
Means responsive to said function generator for intensity modulating said indicator with at least one display point having a set of polar coordinates corresponding to a range $R_i$ and direction angle $\delta_i$ in accordance with the following relationship:

$$R_i = \sin \delta_i \frac{2U^2}{g} \cot \phi$$

where $g$ is the gravitational constant.

11. In cooperation with an aircraft, prediction signalling means for providing an indication of the predicted course of said aircraft relative to viewed terrain, comprising:
A ground mapping radar having an azimuthally scanning antenna and a plan position indicator,
Function generator means responsive to the bank angle $\phi$ of said aircraft and the azimuth direction $\delta$ of said antenna generating the function $\sin \delta \cot \phi$;
Means responsive to said generated function for intensity modulation of said indicator with at least one display point of a locus of points each having polar coordinates corresponding to a range $R_i$ and direction angle $\delta_i$ in accordance with the following relation:

$$R_i = K^1 \sin \delta_i \cot \phi$$

Where
$K^1=$ a proportionality factor

12. In cooperation with a ground-mapping radar having a system trigger, an azimuthally scanning antenna and a plan position indicator,
Function generator means responsive to the azimuth direction $\delta$ of said scanning antenna and the bank angle $\phi$ of an utilizing aircraft for generating substantially the function $\sin \delta \cot \phi$;
Pulsing means responsive to said system trigger for periodic intensity modulating on of said indicator with at least one display point, and further responsive to said function generator means for selectively delaying the time-phase of said modulation relative to said trigger for each displayed azimuth direction $\delta$ having a set of polar coordinates corresponding to a range R and direction angle $\delta$ in accordance with the following relationship:

$$R = K^1 \sin \delta \cot \phi$$

where $K^1$ is a proportionality factor.

13. In cooperation with a ground-mapping radar having an azimuthally scanning antenna and a plan position indicator,
Function generator means responsive to the forward velocity U and bank angle $\phi$ of an utilizing aircraft for generating substantially function $U^2 \cot \phi$; and
Means responsive to said function generator, a system trigger of said radar, and the azimuth direction $\delta$, of said antenna for intensity modulating said indicator to provide a locus of display points, each having a set of polar coordinates corresponding to a successive range $R_i$ and direction angle $\delta_i$ substantially in accordance with the following relationship:

$$R_i = \sin \delta_i \frac{2U^2}{g} \cot \phi$$

where $g$ is the gravitational constant.

14. In cooperation with a ground-mapping radar having an azimuthally scanning antenna and a plan position indicator,
Function generator means responsive to the forward velocity U and bank angle $\phi$ of an utilizing aircraft for generating substantially function $U^2 \cot \phi$;
Multiplier means responsive to said function generator and the azimuth direction $\delta_i$ of said antenna for providing an output indicative of the function $\sin \delta_i U^2 \cot \phi$; and
Pulse position modulator means responsive to said multiplier means and a system trigger of said radar for providing a pulse, the time-phase occurrence of which is modulated as a function of said speed, direction angle and roll angle, an intensity modulation input of said plan position indicator being responsive to said modulated pulse for providing a curved cursor display corresponding to the predicted flight path of said utilizing aircraft.

15. In cooperation with a ground-mapping radar having a system trigger, azimuthally scanning antenna and plan position indicator, the combination comprising
Voltage controlled pulse position modulating means for intensity modulating selected display points on said plan position indicator, the locus of which points describes a curved radar cursor, Computing means responsive to the forward velocity U, roll angle $\phi$ of a utilizing aircraft and the azimuth direction $\delta$ of said scanning antenna and having an output connected to a control input of said modulating means for providing a selective time phase delay of said pulse modulating means.

16. The device of claim 15 in which said computing means is arranged to selectively control the time-phase delay of said pulse modulating means substantially in accordance with the function sin $\delta U^2$ cot $\phi$.

17. The device of claim 15 in which said computing means is comprised of
   A function generator responsive to airspeed U and roll angle $\phi$ for providing a signal indicative of the function $U^2$ cot $\phi$; and
   A signal multiplier responsive to the azimuth angle $\delta$ of said antenna and the output of said generator for providing a control signal indicative of the function sin $\delta U^2$ cot $\phi$.

18. In cooperation with a radar having a scanning antenna, system trigger, and plan position indicator
   A first nonlinear position pickoff responsive to a bank angle $\phi$ signalling source and having a center tapped excitation with two commonly connected end terminals, said commonly connected terminals and a center tapped terminal being adapted to be connected across a source of excitation, and further having an output terminal for providing an attenuated output signal attenuated substantially in accordance with the function, $|\cot \phi|$;
   A second nonlinear position pickoff responsive to the scanning direction $\delta$ of said scanning antenna and having a center tapped excitation element with two end terminals, said end terminals being connected to said output terminal of said first pickoff, a center tap terminal of said second pickoff being connected to said commonly connected end terminals of said first pickoff, and further having an output terminal for providing a further attenuation of said attenuated signal substantially in accordance with the function $|\sin \delta|$;
   Switching means responsive to the sense of said roll angle $\phi$ for disconnecting one and connecting an alternative one of said end terminals of said second pickoff from the output terminal of said first pickoff upon a sense reversal of said roll angle, whereby the said two pickoffs cooperate to generate the even valued function $|\sin \delta \cot \phi|$ for only mutually corresponding senses of azimuth angle $\delta$ and roll angle $\phi$; and
   Pulse position modulation means adapted to be responsive to the system trigger of said radar system and having a control input coupled to the output terminal of said second pickoff for providing a pulsed output for intensity modulation of said indicator of said radar at a selected point in time corresponding to a predicted range and direction of a point on a predicted course.

19. The device of claim 18 in which said first position pickoff is excited by a voltage source having an amplitude varying substantially in accordance with the square of the velocity of a utilizing vehicle.

20. The device of claim 18 in which said first position pickoff is connected to an excitation source comprising a third nonlinear pickoff element adapted to be excited by a source of fixed potential and responsive to the velocity of a utilizing vehicle for providing an output voltage having an amplitude varying substantial in accordance with the square of said velocity.

21. In cooperation with a radar having a scanning antenna, system trigger, and plan position indicator
   A first nonlinear position pickoff responsive to a bank angle signalling source and having a center tapped excitation element with two commonly connected end terminals, said commonly-connected terminals and said center tapped terminal being adapted to be connected across a source of excitation, and an output terminal for providing a variable gain output signal the gain of which tends to be increasingly attenuated as said roll angle increases;
   A second nonlinear position pickoff responsive to the scanning direction angle of said scanning antenna and having a center tapped excitation element with two end terminals, said end terminals being connected to said output terminal a center terminal of said first pickoff being connected to said commonly connected end terminals of said first pickoff, and for an output terminal for providing a further variation of said variable gain signal, which gain tends to increase said direction angle increases;
   Switching means responsive to the sense of said roll angle $\phi$ for disconnecting one and connecting an alternative one of said end terminals of said second pickoff from the output terminal of said first pickoff, upon a sense reversal of said roll angle, whereby the said two pickoffs cooperation to generate a control signal for only mutually corresponding senses of azimuth angle $\delta$ and roll angle $\phi$; and
   Pulse position modulation means adapted to be responsive to the system trigger of said radar system and having a control input coupled to the output of said second pickoff for providing a pulsed output for intensity modulation of said indicator of said radar at a point in time corresponding to a predicted range and direction of a point on a predicted course.

No references cited.

CHESTER L. JUSTUS, *Primary Examiner.*

D. C. KAUFMAN, *Assistant Examiner.*